Nov. 29, 1938.  I. MACKOWIAK  2,138,497
COASTER BRAKE
Filed March 24, 1938  2 Sheets-Sheet 1
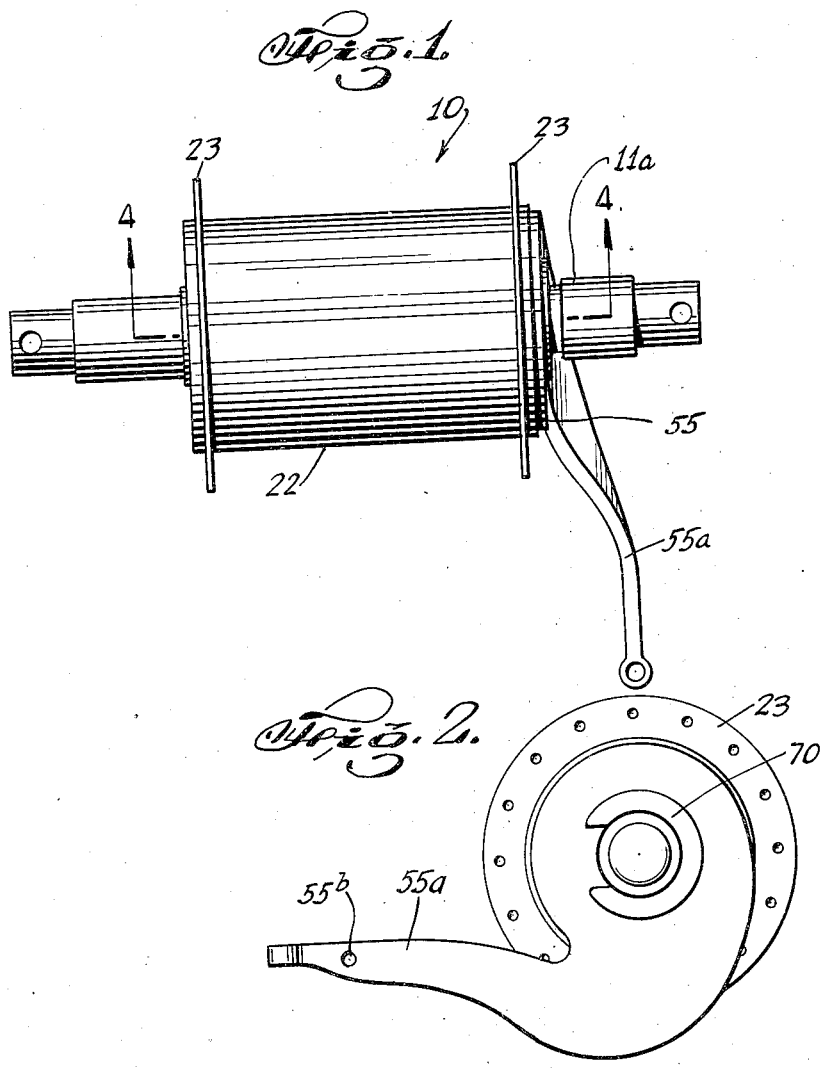
INVENTOR
IGNATIUS MACKOWIAK
BY
Carl Miller
ATTORNEY Nov. 29, 1938.　　　I. MACKOWIAK　　　2,138,497
COASTER BRAKE
Filed March 24, 1938　　　2 Sheets-Sheet 2
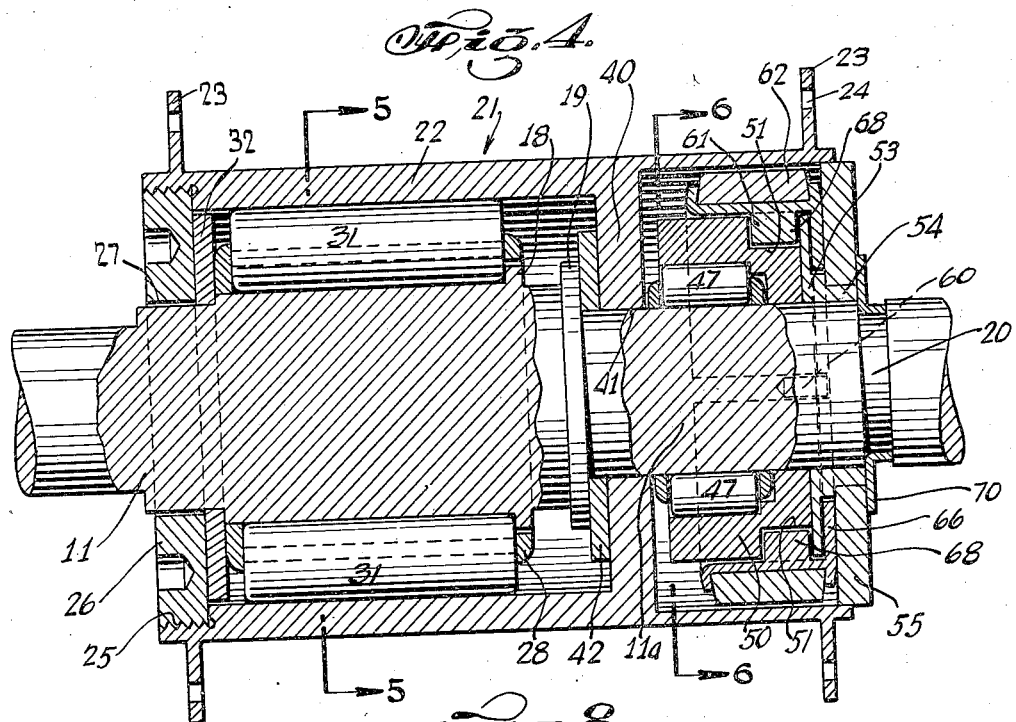
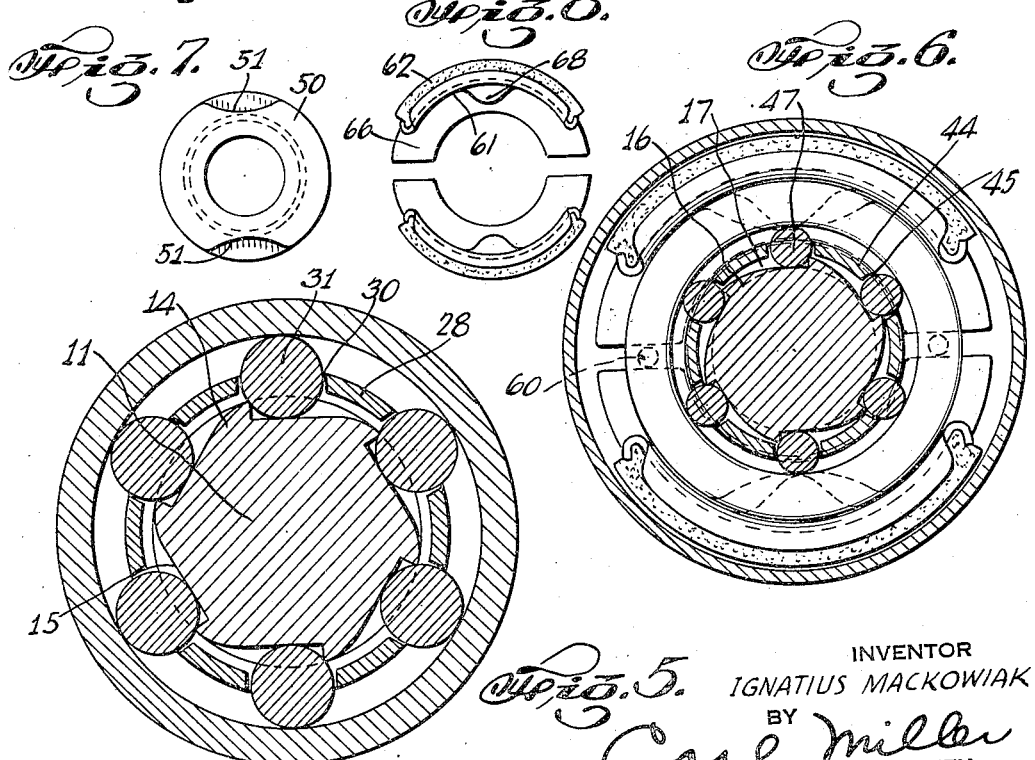
INVENTOR
IGNATIUS MACKOWIAK
BY
Carl Miller
ATTORNEY Patented Nov. 29, 1938

2,138,497

UNITED STATES PATENT OFFICE 2,138,497

COASTER BRAKE

Ignatius Mackowiak, Burnham, Ill.

Application March 24, 1938, Serial No. 197,842

6 Claims. (Cl. 192—6)

This invention relates to a coaster brake. It is particularly directed to a combination clutch and brake for velocipedes, such as, tricycles or bicycles.

An object of this invention is to provide a strong, rugged, compact and durable coaster brake of the character described, which shall be relatively inexpensive to manufacture, positive in action, easy to assemble and operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Figure 1 is a top plan view of a coaster brake embodying the invention;

Figure 2 is one end view thereof;

Figure 3 is the other end view thereof;

Figure 4 is an enlarged, cross-sectional view taken on line 4—4 of Figure 1;

Figure 5 is a cross-sectional view taken on line 5—5 of Figure 4;

Figure 6 is a cross-sectional view taken on line 6—6 of Figure 4;

Figure 7 is an end view of the ring cam; and

Figure 8 is an end view of the brake shoes.

Referring now in detail to the drawing, 10 designates a coaster brake embodying the invention for use in velocipedes, such as, tricycles, bicycles or the like vehicles.

The coaster brake comprises a spindle or shaft 11 and hub 21 which may serve as an axle and hub for the front wheel of a bicycle or for a front wheel of a tricycle. The spindle 11 has a set of cams 14, forming a series of inclined recesses 15, for the purpose hereinafter appearing. Said spindle has a portion 11a of reduced diameter. On portion 11a of the spindle, and spaced from the first set of cams, is a second set of cams 16, forming a series of inclined recesses 17. The cams 14 are arranged oppositely to the cams 16, for the purpose hereinafter appearing.

The spindle 11 is formed with a pair of spaced, parallel flanges 18 and 19 disposed between said sets of cams 14 and 16. Adjacent one end thereof, the spindle is formed with an annular groove 20, for the purpose hereinafter appearing.

Rotatably mounted on the spindle 11 is the wheel hub 21 having a cylindrical wall 22, formed with a pair of outwardly extending annular flanges 23, having openings 24, to receive the spokes of the wheel. Adjacent one end thereof, the cylindrical wall is formed with an internally screw threaded portion 25, to which is screwed a disc 26, formed with a central opening 27 through which the spindle passes. Disc 26 closes one end of the hub 21. Mediately the ends thereof, hub 21 is formed with a transverse wall 40, having a central opening 41, in which is journalled portion 11a of the spindle. Wall 40 is spaced from flange 19, and interposed between said wall and flange is a fiber thrust washer 42.

Disposed about the set of cams 14, is a cage or roller guide 28, formed with a plurality of parallel, equiangularly spaced longitudinal slots 30. Within each of the slots 30 is a roller 31 disposed within one of the inclined recesses 15. Interposed between the cage 28 and the end wall 26, is a fiber or composition thrust washer 32.

The spindle 11 is adapted to be rotated when pedalling the velocipede forwardly. When pedalling forwardly the spindle 11 is rotated in a counterclockwise direction, looking at Fig. 5 of the drawings, to wedge the rollers 31 against the inner surface of the cylindrical portion 22 of the hub, whereby to rotate the wheel. Upon holding the pedal still, the spindle 11 stops rotating, and rotation of the hub in a counterclockwise direction, looking at Fig. 5 of the drawings will move the rollers 31, toward the bottom of the recess 15, to permit the hub 21 to freely rotate, as the velocipede coasts.

Means is provided to brake the velocipedes upon turning the pedals slightly in "reverse" direction with a little force.

Surrounding the set of cams 16, is a roller guide 44, formed with a plurality of spaced, parallel, longitudinal slots 45, each receiving a roller 47. Surrounding the rollers 47, and rotatably mounted on the spindle 11, is an annular ring cam 50.

The cam 50 is formed with a pair of diametrically opposed cammed recesses 51. On the spindle is a brake shoe guide or disc 53 contacting the ring cam 50. Said shoe guide 53 has a sleeve extension 54 on which is fixedly mounted a brake arm 55 adapted to be clamped to the frame of the velocipede. Said brake arm is provided with an extension 55a, formed with an opening 55b, to receive a bolt for clamping the brake arm to the frame of the velocipede.

Supported by the disc 53, are a pair of substantially semi-annular brake shoes 61, each provided with a brake lining 62 adapted to engage the inner surface of the cylindrical wall 22, when the brake is applied in the manner hereinafter explained. To prevent rotation of the brake shoes, there is mounted on member 53 a pair of diametrically disposed pins 60 interposed between the adjacent ends of said brake shoes.

The brake shoes 61 may be provided with flange portions 66 disposed between the disc 53 and the brake arm 55. Each of said brake shoes 61 is formed with an inwardly projecting lug 68 extending within one of the curved cammed recesses 51 of the ring cam 50.

When the spindle is normally rotated in a counterclockwise direction, looking at Fig. 6 of the drawings, the rollers 47 are at the bottom of the recess 17, and hence, do not rotate the ring cam 50. When the spindle is held still, the ring cam 50, is likewise not rotated. However, upon slidably reversing the pedal to rotate the spindle slightly in a clockwise or "reverse" direction, looking at Fig. 6 of the drawings, the rollers 47 will be wedged against the ring cam 50 to rotate the latter in a clockwise direction, whereby the lugs 68 will ride up on the curved surfaces 51 of the ring cam, and the brake shoes 61, will be pressed outwardly against the inner surface of the wheel hub to brake the velocipede.

Within the annular groove 20 is a horseshoe shaped retaining washer 70 to hold the brake arm against shifting.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth, or shown in the accompanying drawings is to be interpreted as illustrative and not in a limiting sense.

Having thus described my invention, I claim as new and desire to secure by Letters Patent:

1. A combination clutch and brake for velocipedes, comprising an axle for a wheel of the velocipede adapted to be rotated upon pedalling the velocipede, a cylindrical hub surrounding said axle and provided with means for connection with the spokes of said wheel, clutch means connecting one portion of said axle with said hub, another potrion of said axle being formed with a plurality of cams, a roller guide surrounding said plurality of cams and formed with a plurality of parallel slots, rollers in said slots, and annular ring surrounding said rollers and being formed with a pair of diametrically disposed cammed depressions, a pair of symmetrically disposed substantially semi-circular brake arms on opposite sides of said ring and each having a lug projecting into one of said depressions, said brake shoes having brake linings adapted to engage the inner surface of said hub upon rotating said spindle in reverse direction.

2. A combination clutch and brake for velocipedes, comprising an axle for a wheel of the velocipede adapted to be rotated upon pedalling the velocipede, a cylindrical hub surrounding said axle and provided with means for connection with the spokes of said wheel, clutch means connecting one portion of said axle with said hub, another portion of said axle being formed with a plurality of cams, a roller guide surrounding said cams and formed with a plurality of parallel slots, rollers in said slots, an annular ring surrounding said rollers and being formed with a pair of diametrically disposed cammed depressions, a pair of symmetrically disposed substantially semi-circular brake arms on opposite sides of said ring and each having a lug projecting into one of said depressions, said brake shoes having brake linings adapted to engage the inner surface of said hub upon rotating said spindle in reverse direction, and means to prevent rotation of said brake shoes.

3. In combination, an axle for the wheel of a velocipede and adapted to be rotated upon pedalling the velocipede, said axle having a set of cams at one part thereof, and a second set of cams at another part thereof, disposed oppositely to the first set of cams, a cylindrical hub for said wheel, mounted for rotation on said axle, a roller guide surrounding the first set of cams and having parallel slots, rollers within said slots engaging said cams and adapted to engage the inner surface of said hub upon pedalling forwardly, a roller guide surrounding the second set of cams and formed with parallel slots, rollers within said slots and engaging the cams of said second set, an annular ring journalled on said axle and having a portion surrounding said rollers and formed with a pair of diametrically opposed cammed depressions, a member rotatably mounted on said axle and contacting said ring, and a pair of symmetrically disposed, diametrically opposed, brake shoes mounted on said member, and each having a lug within one of the depressions in said ring, and brake linings on said brake shoes adapted to engage the inner surface of said hub.

4. In combination, an axle for the wheel of a velocipede and adapted to be rotated upon pedalling the velocipede, said axle having a set of cams at one part thereof, and a second set of cams at another part thereof, disposed oppositely to the first set of cams, a cylindrical hub for said wheel, mounted for rotation on said axle, a roller guide surrounding the first set of cams and having parallel slots, rollers within said slots engaging said cams and adapted to engage the inner surface of said hub upon pedalling forwardly, a roller guide surrounding the second set of cams and formed with parallel slots, rollers within said slots and engaging the cams of said second set, an annular ring journalled on said axle and having a portion surrounding said rollers and formed with a pair of diametrically opposed cammed depressions, a member rotatably mounted on said axle and contacting said ring, and a pair of symmetrically disposed, diametrically opposed, brake shoes mounted on said member, and each having a lug within one of the depressions in said ring, brake linings on said brake shoes adapted to engage the inner surface of said hub, and a pair of pins fixed to said member and disposed between the adjacent ends of said brake shoes, to prevent rotation of said brake shoes relative to said member.

5. In combination, an axle for the wheel of a velocipede and adapted to be rotated upon pedalling the velocipede, said axle having a set of cams at one part theeof, and a second set of cams at another part thereof, disposed oppositely to the first set of cams, a cylindrical hub for said wheel, mounted for rotation on said axle, a roller guide surrounding the first set of cams and having parallel slots, rollers within said slots engaging said cams and adapted to engage the inner surface of said hub upon pedalling forwardly, a roller guide surrounding the second set of cams and formed with parallel slots, rollers within said slots and engaging the cams of said second set, an annular ring journalled on said axle and having a portion surrounding said rollers and formed with a pair of diametrically opposed cammed depressions, a member rotatably mounted on said axle and contacting said ring, and a pair of symmetrically disposed, diametrically opposed, brake shoes mounted on said member, and each having a lug within one of the depressions in said ring, brake linings on said brake shoes adapted to engage the inner surface of said hub, and a brake arm fixed to said member and adapted to be clamped to the frame of the velocipede, said brake arm having a portion closing one end of said hub, and means on said axle to retain said brake arm against longitudinal shifting on said axle.

6. In combination, an axle for the wheel of a velocipede and adapted to be rotated upon pedalling the velocipede, said axle having a set of cams at one part thereof, and a second set of cams at another part thereof, disposed oppositely to the first set of cams, a cylindrical hub for said wheel, mounted for rotation on said axle, a roller guide surrounding the first set of cams and having parallel slots, rollers within said slots engaging said cams and adapted to engage the inner surface of said hub upon pedalling forwardly, a roller guide surrounding the second set of cams and formed with parallel slots, rollers within said slots and engaging the cams of said second set, an annular ring journalled on said axle and having a portion surrounding said rollers and formed with a pair of diametrically opposed cammed depressions, a member rotatably mounted on said axle and contacting said ring, and a pair of symmetrically disposed, diametrically opposed, brake shoe mounted on said member, and each having a lug within one of the depressions in said ring, brake linings on said brake shoes adapted to engage the inner surface of said hub, and a brake arm fixed to said member and adapted to be clamped to the frame of the velocipede, said brake arm having a portion closing one end of said hub, and means on said axle to retain said brake arm against longitudinal shifting on said axle, the other end of said hub being formed with an internally screw threaded portion, and an annular disc screwed to said screw threaded portion for closing said other end of said hub.

IGNATIUS MACKOWIAK.